US 11,661,754 B2

(12) United States Patent
Schmidt et al.

(10) Patent No.: US 11,661,754 B2
(45) Date of Patent: May 30, 2023

(54) UNIVERSAL VIBRATORY HANDLE FOR CEMENTITIOUS SURFACE FLOATS

(71) Applicant: Mid-Eastern Indiana Tool, LLC, Hamilton, OH (US)

(72) Inventors: Daniel C. Schmidt, Mooreland, IN (US); Benjamin M. Schmidt, Mooreland, IN (US); David C. Baker, Hamilton, OH (US)

(73) Assignee: Mid-Eastern Indiana Tool, LLC, Hamilton, OH (US)

( * ) Notice: Subject to any disclaimer, the term of this patent is extended or adjusted under 35 U.S.C. 154(b) by 137 days.

(21) Appl. No.: 17/137,488

(22) Filed: Dec. 30, 2020

(65) Prior Publication Data

US 2021/0207389 A1 Jul. 8, 2021

Related U.S. Application Data

(60) Provisional application No. 62/958,038, filed on Jan. 7, 2020.

(51) Int. Cl.
*E01C 19/40* (2006.01)
*E04F 21/24* (2006.01)
*H02K 7/06* (2006.01)
*B25F 5/00* (2006.01)

(52) U.S. Cl.
CPC ............ *E04F 21/242* (2013.01); *B25F 5/006* (2013.01); *E01C 19/402* (2013.01); *H02K 7/061* (2013.01)

(58) Field of Classification Search
CPC ...... E04F 21/242; B25F 5/006; E01C 19/402; H02K 7/061

USPC ............. 404/72, 75, 93, 113, 114; 15/235.4
See application file for complete search history.

(56) References Cited

U.S. PATENT DOCUMENTS

| | | | | |
|---|---|---|---|---|
| 4,634,611 A * | 1/1987 | Browning | ............... | B05B 7/205 239/81 |
| 4,958,399 A * | 9/1990 | Toal | .................... | E04F 21/162 15/245.1 |
| 5,193,244 A * | 3/1993 | Meyers | ................. | E04F 21/163 15/245.1 |
| 5,632,569 A * | 5/1997 | Szmansky | ............. | E04F 21/163 404/97 |
| 6,668,417 B1 * | 12/2003 | Slattery | ................... | G01C 9/26 15/235.4 |
| 7,465,121 B1 * | 12/2008 | Hendricks | ............. | E04F 21/161 15/235.4 |
| 11,142,875 B2 * | 10/2021 | Lightfoot | .............. | E04F 21/242 |
| 2005/0036837 A1 * | 2/2005 | Marshall | ................... | B25F 5/00 404/114 |

(Continued)

*Primary Examiner* — Raymond W Addie
(74) *Attorney, Agent, or Firm* — Wood Herron & Evans LLP (57) ABSTRACT

A vibratory handle for use with a surface finishing float, the vibratory handle including a first end having a bore for receiving a first float attachment screw therein for attaching the first end to the finishing float. The vibratory handle further including a second end having an oblong slot for receiving a second float attachment screw therein for attaching the second end to the finishing float such that the first float attachment screw and second float attachment screw are in operative alignment and spaced apart a distance along a surface the float. The vibratory handle also includes a gripping portion extending between the first end and second end.

19 Claims, 6 Drawing Sheets

(56) References Cited

U.S. PATENT DOCUMENTS

| | | | |
|---|---|---|---|
| 2008/0050177 A1* | 2/2008 | Sager | E04F 21/161 404/112 |
| 2018/0148938 A1* | 5/2018 | Chang | E04F 21/163 |
| 2019/0100887 A1* | 4/2019 | Contrino | E04F 21/161 |
| 2021/0189740 A1* | 6/2021 | Black | E04F 21/163 |

* cited by examiner

UNIVERSAL VIBRATORY HANDLE FOR CEMENTITIOUS SURFACE FLOATS

CROSS-REFERENCE TO RELATED APPLICATION

This application claims the benefit of U.S. Provisional Application Ser. No. 62/958,038 filed on Jan. 7, 2020, the disclosure of which is hereby incorporated by reference in its entirety.

FIELD OF THE INVENTION

This invention relates to floats for finish work on concrete surfaces, and more particularly to handles for surface finishing floats.

BACKGROUND OF THE INVENTION

When laying cementitious materials such as concrete, it is common to treat the uncured surface with floats for smoothing or forming the ultimately desirable surface in the eventually cured concrete. Such floats may, for example, comprise flat, smooth surfaces applied to the unfinished concrete surface via manual handles attached to the floats for manually gripping and smoothing or otherwise finishing the wet surface by "floating" over the surface.

While it is known to apply a vibrating impulse to the float, and while the flat floats comprise handle-attaching structures, the floats currently provided by a variety of float suppliers, including the handle attaching mechanisms for the floats, are widely varying in structure and function. Thus, to provide changeable handles for attachment to the floats, the handles must be specifically configured to the handle attachment structures for each float design. The problem is that these structures are frequently so different that a handle which can be attached to one float cannot fit, or be usefully and functionally attached to the different float of another supplier.

Thus, if a concrete finisher wishes to apply a vibratory function to a variety of different floats, he must obtain or have in his inventory a plurality of different handles, one to fit the differing floats from each supplier he intends to use. This increases the finisher's inventory and equipment costs.

Accordingly, it is desirable, and one objective of this invention, to provide a vibratory handle for a variety of finishing floats differing in handle-attachment mechanisms.

Another objective of the invention is to provide a universal vibratory handle that is functionally attachable to a variety of floats.

SUMMARY OF THE INVENTION

According to one aspect of the invention, a vibratory handle for use with a surface finishing float is provided. The surface finishing float may be used with uncured cementious material, for example. The vibratory handle includes a first end having a bore for receiving a first float attachment screw therein for attaching the first end to the finishing float. The vibratory handle further includes a second end having an oblong slot for receiving a second float attachment screw therein for attaching the second end to the finishing float such that the first float attachment screw and second float attachment screw are in operative alignment and spaced apart a distance along a surface the float. The vibratory handle also includes a gripping portion extending between the first end and second end.

In one embodiment, the second float attachment screw is movable within the oblong slot to change the distance between the first float attachment screw along the surface of the float to accommodate for different sized floats, for example. The oblong slot may include an annular shoulder. Furthermore, a head of the second float attachment screw may be configured to be in an abutting relationship with the annular shoulder when secured to the finishing float.

In another embodiment, the second end of the vibratory handle may include a rubber damper. The rubber damper may be positioned in a recess in the second end of the handle.

In yet another embodiment, the vibratory handle may further include a vibratory motor in the handle for imparting vibration to the finishing float. The vibratory handle may further include a motor housing having a cover for storing the vibratory motor therein. To this end, the motor housing may be coupled to the first end of the vibratory handle. Furthermore, the motor housing may be positioned between an underside of the first end of the vibratory handle and the float.

In one embodiment, a rubber damper may be positioned between the motor housing and the vibratory handle. The rubber damper may further be positioned within a recess in the handle. Furthermore, the vibratory handle might include a second rubber damper positioned between the motor housing and the handle. The second rubber damper may be positioned within a recess in the handle.

In yet another embodiment, a portion of the motor housing may be positioned within a recess in the vibratory handle.

In another embodiment, the vibratory handle further includes a source of power for the vibratory motor and a switch for activating the vibratory motor stored in the gripping portion of the vibratory handle. The switch may be positioned through a bore in the gripping portion of the handle and extend to an external position on the handle. In one embodiment, the source of power may be a rechargeable battery.

According to another aspect of the invention, a method of assembling a vibratory handle from a first surface finishing float to a second finishing float includes providing a vibratory handle coupled to a first surface finishing float. The vibratory handle includes a first end coupled to the first finishing float with a first float attachment screw, and a second end having an oblong slot for receiving a second float attachment screw therein for attaching the second end to the first finishing float such that the first float attachment screw and second float attachment screw are in operative alignment and spaced apart a first distance along a surface the first finishing float. The method further includes providing a second finishing float of a different size compared to the first finishing float. Furthermore, the method includes unscrewing the first and second float attachment screws from the vibratory handle and first finishing float and removing the vibratory handle from the first finishing float. The method further includes placing the vibratory handle on the second finishing float and securing the first float attachment screw to the second finishing float, sliding the second float attachment screw within the oblong slot to accommodate for the size difference between the first finishing float and the second surface finishing float. Lastly, the method includes securing the second float attachment screw to the second finishing float such that the first float attachment screw and second float attachment screw are in operative alignment and spaced apart second first distance along a surface the second finishing float.

According to another aspect of the invention, a method of using a vibratory handle with a surface finishing float includes providing a vibratory handle coupled to a surface finishing float. The vibratory handle including a vibratory motor for imparting vibration to the finishing float, a source of power for the vibratory motor, and a switch for activating the vibratory motor positioned on a gripping portion of the vibratory handle. The method further includes providing uncured cementitious material such as concrete and moving the surface finishing float over the cementious material while simultaneously pressing the switch to activate the vibratory motor thereby imparting vibration to the finishing float and cementious material.

BRIEF DESCRIPTION OF THE DRAWINGS

These and other objectives and advantages will become more apparent from the following written description and from the drawings. The accompanying drawings, which are incorporated in and constitute a part of this specification, illustrate embodiments of the invention and, together with a general description of the invention given below, serve to explain the principles of the invention.

DETAILED DESCRIPTION OF THE DRAWINGS

Figure 1:
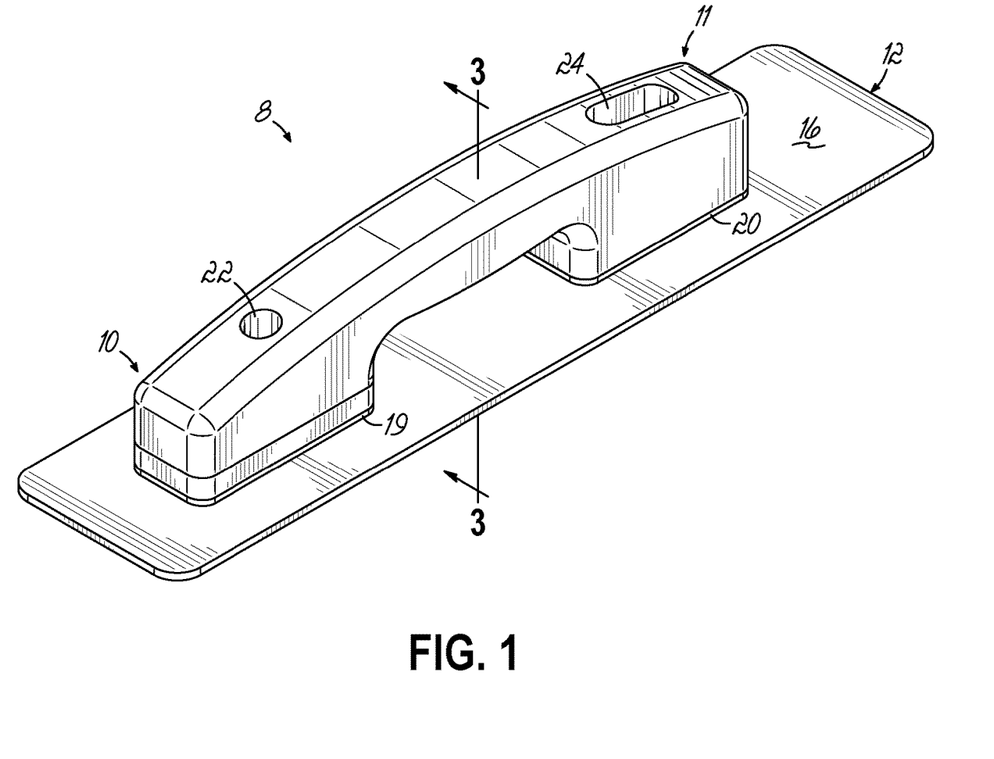
FIG. 1 is an isometric perspective view of the handle of the invention as applied to a float.
Figure 3:
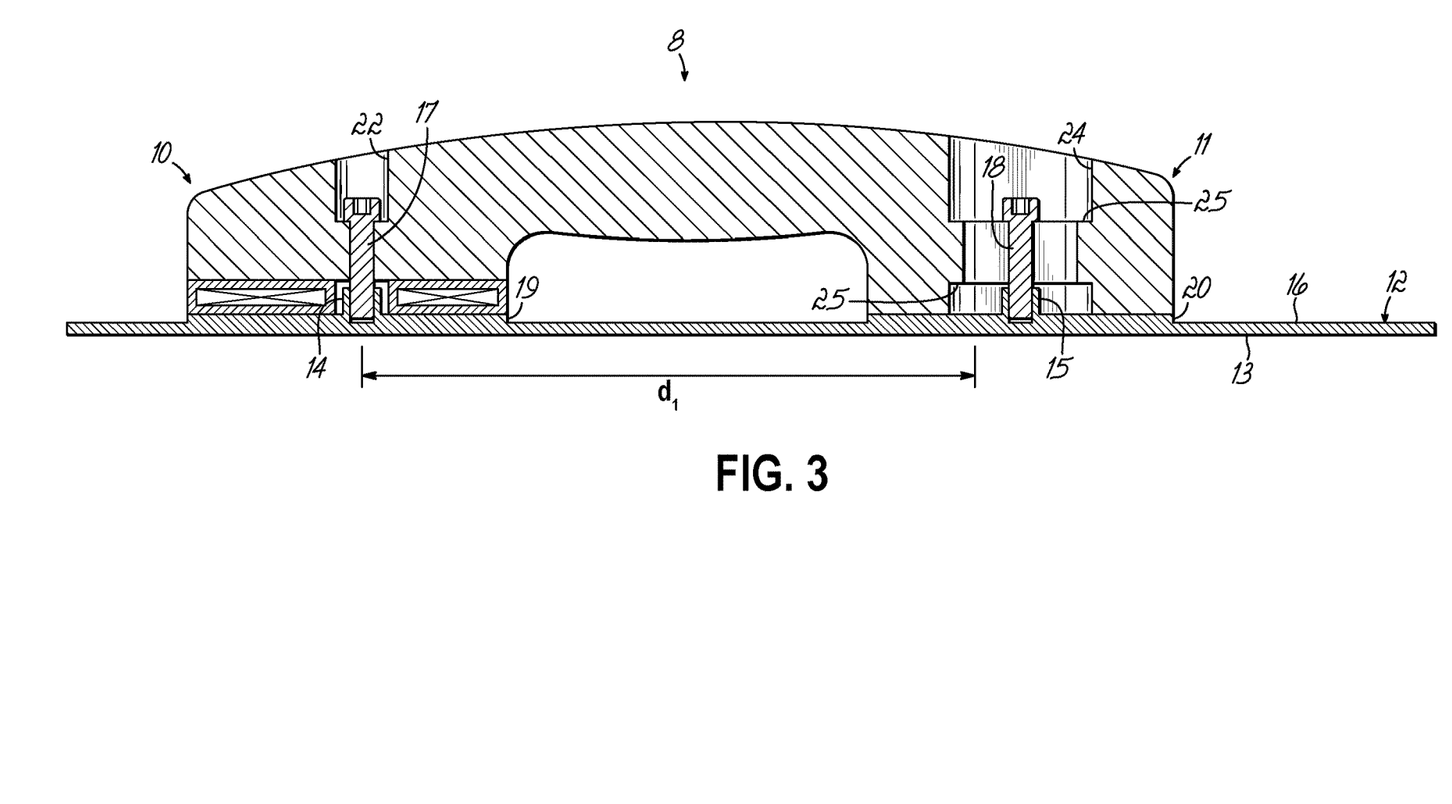
FIG. 3 is a cross-sectional view taken along line 3-3 of FIG. 1 and diagrammatically illustrating handle-to-float mounting screws in one position in the handle as in FIG. 2.

One embodiment of a universal handle 8 according to the invention is diagrammatically illustrated in FIG. 1 operationally attached to the top surface of a cementitious material finishing float or tool 12. The underside 13 of float 12 is not shown in FIG. 1, but is seen in FIG. 3. It will be appreciated that float 12 may be of any suitable surface finishing configuration, smooth, grooved edge or the like.

Figure 2:
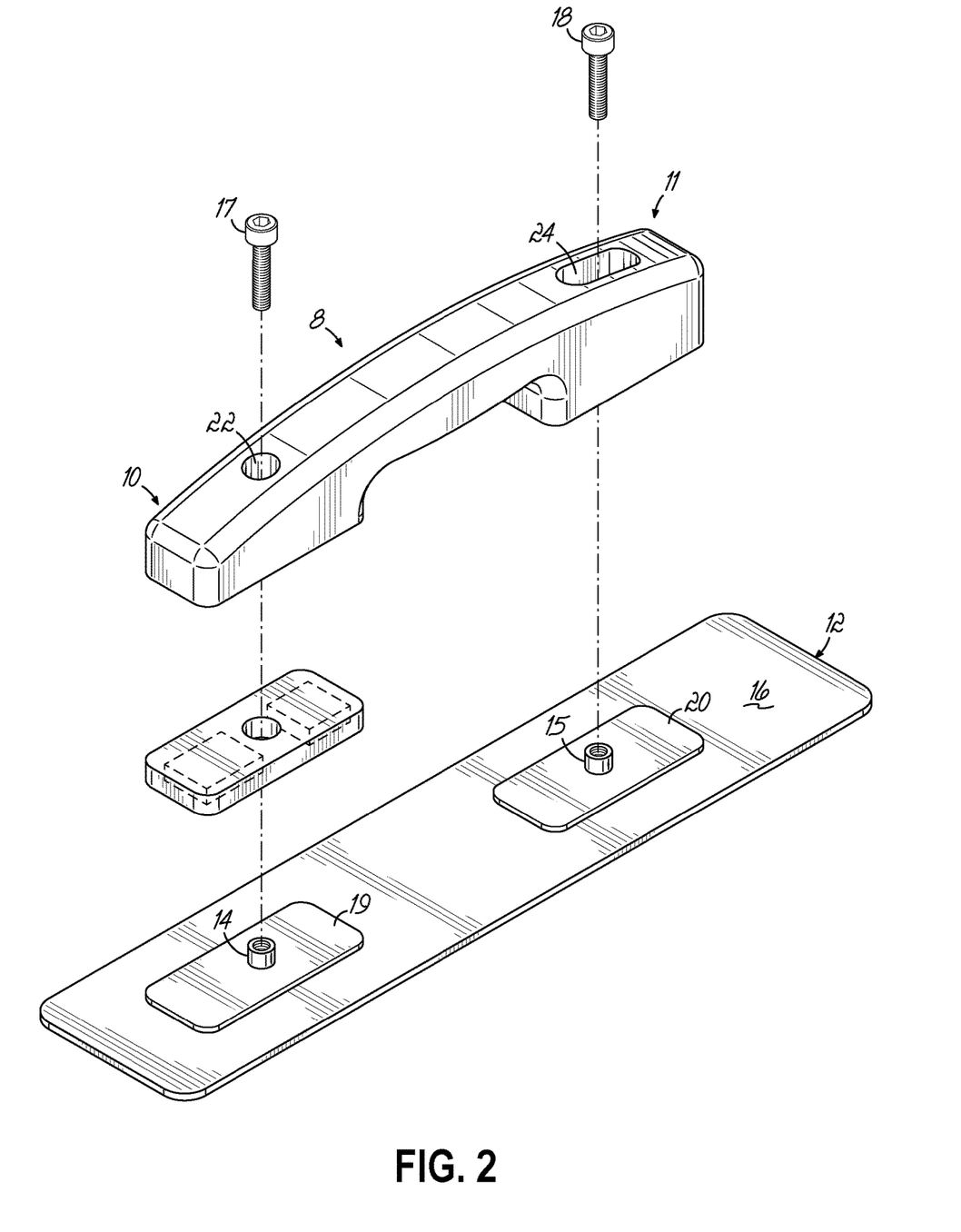
FIG. 2 is a exploded isometric view of the FIG. 1.

FIGS. 1-3 illustrate the universal handle 8 combined with one form of float 12 having mounting bosses 14, 15 on top surface 16 thereof. Mounting screws 17, 18 extend through the handle 8 to secure it by threading into respective bosses 14, 15. More particularly, mounting screw 17 secures a first end 10 of the handle to boss 14, and mounting screw 18 secures a second end 11 of the handle 8 to boss 15. As shown, bosses 14, 15 are secured to surface 16 by any suitable means, and are preferably secured in flanges 19, 20 secured or formed on top surface 16 of float 12.

With continuing reference to FIGS. 1-3, screw 17 extends through bore 22 in the first end 10 of the handle 8. Screw 18 extends through elongated slot 24 in the second end 11 of the handle 8 and toward boss 15 on float 12. As shown, the elongated slot 24 is generally oblong in shape. In this manner, screw 18 can be oriented in a variety positions within the elongated slot 24 in handle 8 and along the surface 16 of the float 12. For example, the screw 18 may be positioned within the elongated slot 24 closer to the first end 10 of the float 12 or, alternatively, spaced away from the first end 10 of the float 12 in a longitudinal direction. The ability to longitudinally index the screw 18 within the elongated slot 24 of the handle 8 permits the handle 8 to be used with a variety of floats having different sizes and designs, as discussed in additional detail below. FIG. 3 illustrates screw 18 disposed centrally in slot 24. As shown, the elongate slot further includes an annular projection that defines shoulders 25 configured to abut the head of screw 18 for coupling of the handle 8 to the float 12.

Figure 4:
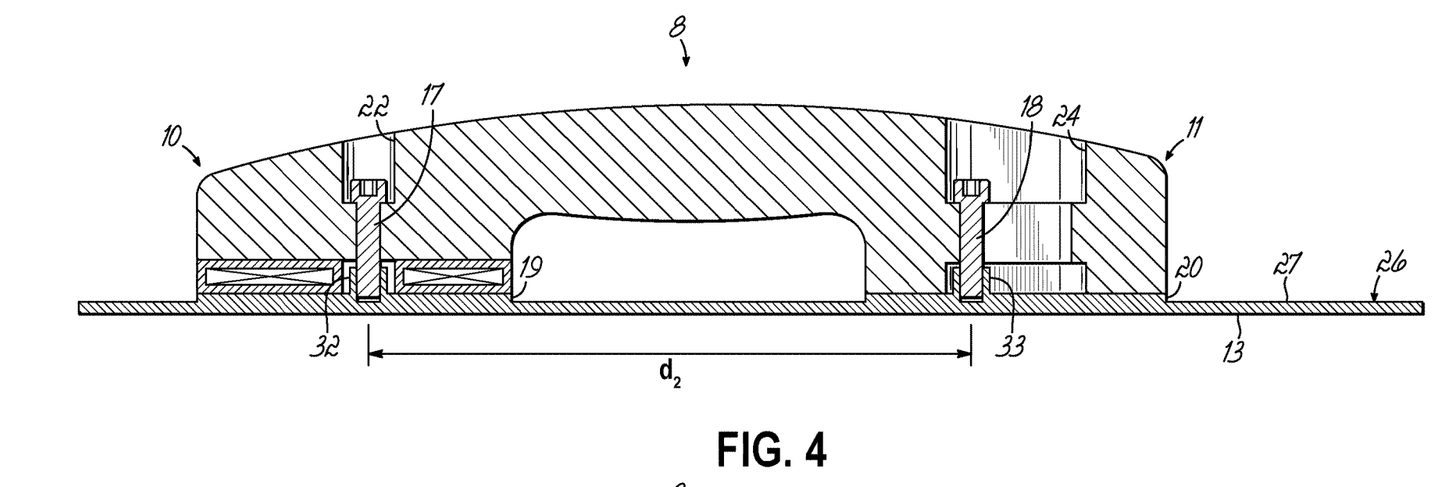
FIG. 4 is a cross-sectional view similar to FIG. 3 of an alternative embodiment illustrating the handle with handle-to-float mounting screws in another position for another form of float.
Figure 5:
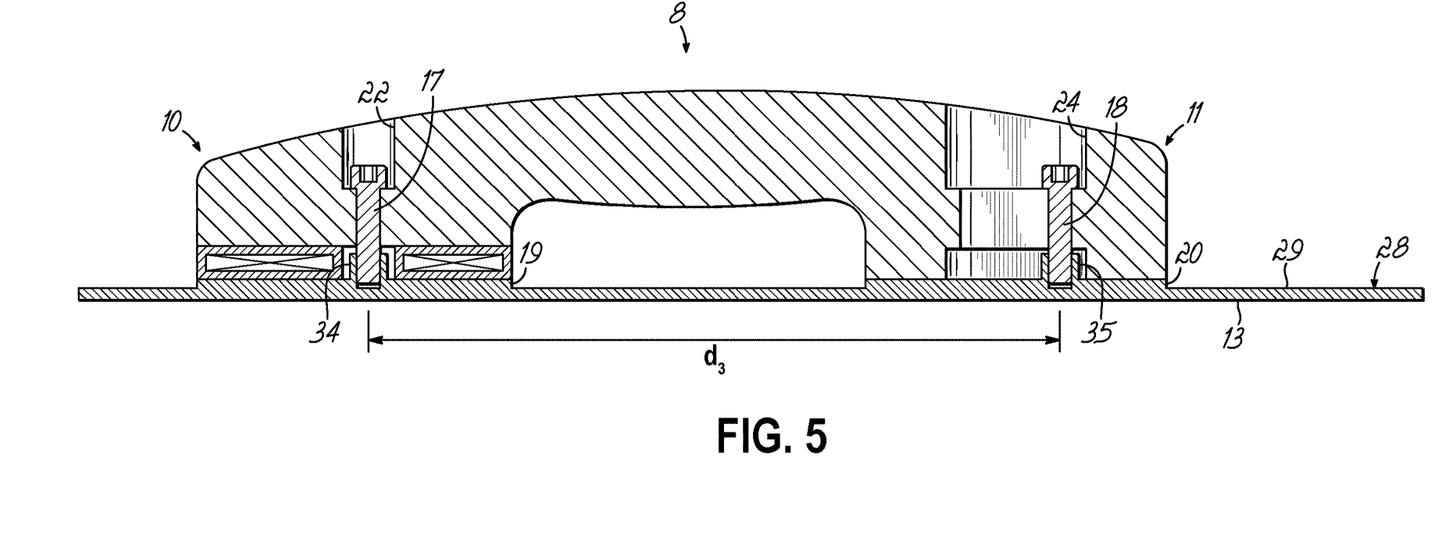
FIG. 5 is a cross-sectional view similar to FIG. 4 of yet another alternative embodiment illustrating handle-to-float tool mounting screws in yet another position for another form of float.

The universal capability of handle 8 for attachment to, and use with a variety of floats will be appreciated from a comparison of FIGS. 3, 4 and 5 which show handle 8 operationally combined with different cementitious surface finishing floats 12, 26 and 28. Among other features, these floats 12, 26, 28 differ from each other in how the handle 8 is mounted to their respective upper surfaces 16, 27 and 29. With more particularity, and for example only, note the placement of the screw 18 relative to screw 17 as shown by distances d1, d2, and d3 (see e.g., 14, 15 of FIG. 3; 32, 33 of FIG. 4 float 26 and 34, 35 of FIG. 5, float 28). Thus, distances d1, d2 and d3 are respectively different, yet these differential structures are accommodated by the adjustability of screw 18 within elongated slot 24. Screw 18 is applied with handle 8 to any of the respective floats 12, 26, 28 having mounting bosses of different spatial distances. Thus for whatever mount feature is presented by the respective floats 12, 26, 28, the universal handle 8 is capable of operational attachment to each of the floats 12, 26, 28.

While one respective difference of the floats is described above, it will be appreciated that a variety of floats having different configurations or structures can be provided with a universal handle to universally accommodate a variety of different floats.

Further, it will be noted that respective bosses 14, 15, bosses 32, 33 and bosses 34, 35 can be provided on the respective floats 12, 26 and 28, and mounted to the float 12 by flanges 19, 20.

FIGS. 1-5 diagrammatically illustrate the universal handle 8 as a vibratory handle, capable of applying vibration to the float 12, 26 or 28 to which it is attached. Such vibration is useful in smoothing the unfinished cementitious surface to which the floats are applied or in creating the desired finish. In order to impart vibration to the respective floats, the handle 8 is preferably provided with a vibratory motor 40, a source of power such as a rechargeable battery 42, a USB battery charging port 43, a suitable switch 44 and any suitable circuitry and circuit board 45, which may be varied as desired. For example, a finisher may, by moving the surface finishing float over the cementious material while simultaneously pressing the switch 44 to activate the vibratory motor 40, impart vibration to the finishing float and cementious material.

As an example, one form of vibratory motor 40 may be a vibrative motor having an eccentric rotating mass, rated at about 3.7 volts DC and within a range of 3-6 volts DC. Such a motor is model: 20730-351735 provided by Mendelsons of Dayton, Ohio. However, any suitable motor can be used.

Figure 6:
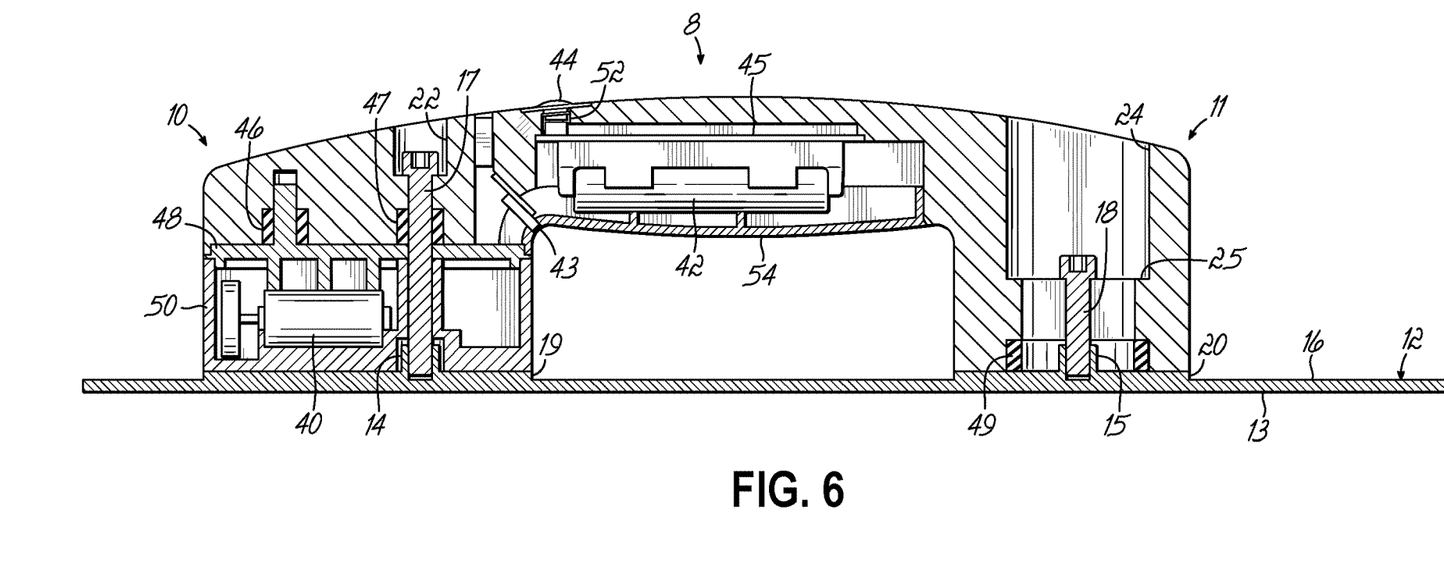
FIG. 6 is an illustrative cross-sectional view diagrammatically illustrating internal components of one embodiment of the handle.
Figure 6A:
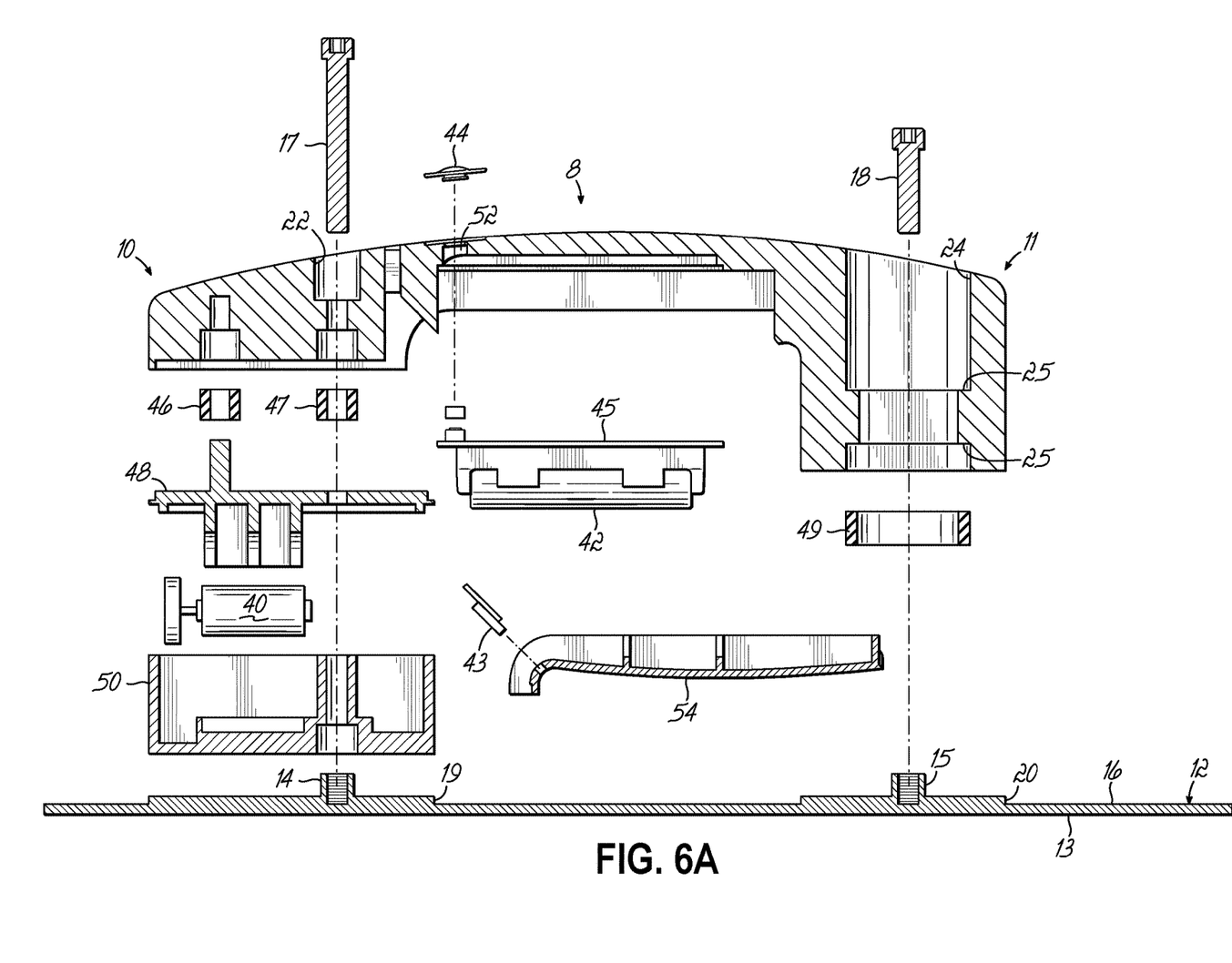
FIG. 6A is an exploded view of FIG. 6.

As shown in FIGS. 6 and 6A, the motor 40 may be mounted to the handle 8 using rubber dampers 46, 47, and 49, motor cover 48, and motor housing 50, all as may be suitable. As shown, portions of the first and second ends 10, 11 of the handle 8 that contact the float may have at least one rubber damper 46, 47, 49 positioned between the handle 8 and the float. The rubber dampers 46, 47, 49 may be partially or fully recessed into the handle 8. As shown, the rubber dampers 46, 47 are recessed into the handle 8 and in contact with a portion of the motor cover 48. Similarly, the motor cover 48 is partially recessed into the handle 8. In this regard, part of the motor cover 48 may extend through at least one rubber damper 46 and into the handle 8. The motor cover 48 may be coupled to the underside of the first end 10 of the handle 8 using a flat head screw or other similar means of attachment. The motor cover 48 and motor housing 50 may also be coupled together using a screw or other similar means. Alternatively, the motor cover 48 may be frictionally fit or coupled to the motor housing 50.

With continued reference to FIGS. 6 and 6A, the motor housing 50 is positioned between the handle 8 and the float 12. More particularly, the motor housing 50 is positioned on flange 19 and sandwiched between the flange 19 and the first end 10 of the handle 8. The motor housing 50 may include a recess configured to receive boss 14 therein so that the motor housing 50 sits flush with flange 19. As shown, screw 17 is positioned through bore 22, damper 47, the motor housing 50, and threaded to mounting boss 14. The second end 11 of the handle 8 is coupled to the float 12 with screw 18. As shown, rubber damper 49 may be recessed into a portion of this end 11 of the handle 8 and positioned between the handle 8 and the flange 20. The damper 49 may be ring or oblong in shape to allow longitudinal indexing of the screw 18 within the slot 24. As shown, a portion of the damper 49 may abut shoulders 25.

It will be appreciated that features of the motor, its mounting and the like as in FIGS. 6, 6A are only diagrammatically shown in FIGS. 1-5 for clarity.

With continuing reference to FIGS. 6 and 6A, the switch 44 for activating the vibratory motor 40 is positioned on the gripping portion of the handle 8 (i.e., the portion of the handle gripped by the hand of a user). As shown, the gripping portion extends between the first end 10 and the second end 11 of the handle 8. The underside of the gripping portion of the handle 8 includes a recess configured to receive the circuity board 45 and battery 42 therein. The gripping portion further includes a bore 52 for receiving parts of the switch 44 therethrough such that the switch 44 is positioned on an external position on the handle 8. In this regard, the switch 44 may be positioned on top of the handle 8, thereby being more accessible to the finisher, while the related circuitry 45 and battery 42 remain stored in the underside of the gripping portion of the handle 8. The handle 8 further includes a cover 54 for enclosing the circuitry 45 and battery 42 within the recess on the underside of the gripping portion of the handle 8. The circuitry 45 and battery 42 are in electrical communication with the motor 40 through a passage in the first end 10 of the handle 8. The battery 42 is chargeable using the USB charging port 43 located on the first end 10 of the handle 8.

Accordingly, it will be appreciated that the invention comprises a universal handle 8 for use with a variety of finishing floats which, nevertheless, but for the invention, would require separate vibratory handles for fitting to each different float.

Alternatively, it will be appreciated that while float bosses and handle screws are described herein, other handle-to-float mounting mechanisms of any suitable construction are contemplated with handle structures provided to universally accommodate a plurality of different float mounting structures.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

In accordance with these and other possible variations and adaptations of the present invention, the scope of the invention should be determined in accordance with the following claims, only, and not solely in accordance with that embodiment within which the invention has been taught.

These and other advantages and alternatives will be appreciated to those of ordinary skill in the art without departing from the scope of the invention and applicant intends to be bound only by the claims appended hereto:

What is claimed is:

1. A vibratory handle for use with a surface finishing float, the vibratory handle comprising:
    a first end having a bore for receiving a first float attachment screw therein for attaching the first end to the finishing float;
    a second end having an oblong slot for receiving a second float attachment screw therein for attaching the second end to the finishing float such that the first float attachment screw and second float attachment screw are in operative alignment and spaced apart a distance along a surface the float; and
    a gripping portion extending between the first end and second end;
    wherein the vibratory handle further includes a vibratory motor for imparting vibration to the finishing float, and
    wherein the vibratory motor is positioned between an underside of the first end of the vibratory handle and the float.

2. The vibratory handle of claim 1, wherein the second float attachment screw is movable within the oblong slot to change the distance between the first float attachment screw along the surface of the float.

3. The vibratory handle of claim 1, wherein the oblong slot further includes an annular shoulder.

4. The vibratory handle of claim 3, wherein a head of the second float attachment screw is in an abutting relationship with the annular shoulder when secured to the finishing float.

5. The vibratory handle of claim 1, wherein the second end of the handle includes a rubber damper.

6. The vibratory handle of claim 5, wherein the rubber damper is positioned in a recess in the second end of the vibratory handle.

7. The vibratory handle of claim 1, wherein the vibratory handle further includes a motor housing having a cover for storing the vibratory motor therein.

8. The vibratory handle of claim 7, wherein a portion of the motor housing is positioned within a recess in the vibratory handle.

9. The vibratory handle of claim 7, wherein the motor housing is coupled to the first end of the vibratory handle.

10. A vibratory handle for use with a surface finishing float, the vibratory handle comprising:
    a first end having a bore for receiving a first float attachment screw therein for attaching the first end to the finishing float;
    a second end having an oblong slot for receiving a second float attachment screw therein for attaching the second end to the finishing float such that the first float attachment screw and second float attachment screw are in operative alignment and spaced apart a distance along a surface the float; and a gripping portion extending between the first end and second end, wherein the vibratory handle further includes a vibratory motor for imparting vibration to the finishing float, wherein the vibratory motor is positioned between an underside of the first end of the vibratory handle and the float, wherein the vibratory handle further includes a motor housing having a cover for storing the vibratory motor therein, and wherein the motor housing is positioned between an underside of the first end of the vibratory handle and the float.

11. A vibratory handle for use with a surface finishing float, the vibratory handle comprising:

a first end having a bore for receiving a first float attachment screw therein for attaching the first end to the finishing float;

a second end having an oblong slot for receiving a second float attachment screw therein for attaching the second end to the finishing float such that the first float attachment screw and second float attachment screw are in operative alignment and spaced apart a distance along a surface the float; and a gripping portion extending between the first end and second end, wherein the vibratory handle further includes a vibratory motor for imparting vibration to the finishing float, wherein the vibratory motor is positioned between an underside of the first end of the vibratory handle and the float, wherein the vibratory handle further includes a motor housing having a cover for storing the vibratory motor therein, and wherein a rubber damper is positioned between the motor housing and the vibratory handle.

12. The vibratory handle of claim 11, wherein at the rubber damper is positioned within a recess in the vibratory handle.

13. The vibratory handle of claim 11, wherein a second rubber damper is positioned between the motor housing and the vibratory handle.

14. The vibratory handle of claim 11, wherein the second rubber damper is positioned within a recess in the vibratory handle.

15. The vibratory handle of claim 1, wherein the vibratory handle further includes a source of power for the vibratory motor and a switch for activating the vibratory motor, both being stored in the gripping portion of the vibratory handle.

16. The vibratory handle of claim 15, wherein the switch is positioned through a bore in the gripping portion of the handle such that the switch extends to an external position on the handle.

17. The vibratory handle of claim 15, wherein the source of power is a rechargeable battery.

18. A method of assembling a vibratory handle from a first surface finishing float to a second finishing float, the method comprising:

providing the vibratory handle of claim 1 coupled to a first surface finishing float;

providing a second finishing float of a different size compared to the first finishing float;

unscrewing the first and second float attachment screws from the vibratory handle and first finishing float;

removing the vibratory handle from the first finishing float;

placing the vibratory handle on the second finishing float and securing the first float attachment screw to the second finishing float;

sliding the second float attachment screw within the oblong slot to adjust for the size difference between the first finishing float and the second surface finishing float; and securing the second float attachment screw to the second finishing float in a different position within the oblong slot such that the first float attachment screw and second float attachment screw are in operative alignment and spaced apart a second distance along a surface of the second finishing float.

19. A method of using a vibratory handle with a surface finishing float, the method comprising:

providing the vibratory handle of claim 1 coupled to a surface finishing float, the vibratory handle having a source of power for the vibratory motor and a switch for activating the vibratory motor positioned on a gripping portion of the vibratory handle;

providing uncured cementitious material; and moving the surface finishing float over the uncured cementious material while simultaneously activating the switch to power the vibratory motor thereby imparting vibration to the finishing float and uncured cementious material.

* * * * *